(12) United States Patent
Yudkin et al.

(10) Patent No.: US 8,997,177 B2
(45) Date of Patent: Mar. 31, 2015

(54) GRAPHICAL ENCRYPTION AND DISPLAY OF CODES AND TEXT

(75) Inventors: Roman O. Yudkin, Carlsbad, CA (US); Sarah Needham, San Diego, CA (US)

(73) Assignee: Confident Technologies, Inc., Solana Beach, CA (US)

( * ) Notice: Subject to any disclaimer, the term of this patent is extended or adjusted under 35 U.S.C. 154(b) by 148 days.

(21) Appl. No.: 13/485,799

(22) Filed: May 31, 2012

(65) Prior Publication Data

US 2013/0138968 A1 May 30, 2013

Related U.S. Application Data

(63) Continuation-in-part of application No. 12/977,559, filed on Dec. 23, 2010, now Pat. No. 8,850,519, which is a continuation of application No. 11/677,562, filed on Feb. 21, 2007, now abandoned, which is a continuation-in-part of application No. 11/420,061, filed on May 24, 2006, now abandoned.

(60) Provisional application No. 61/492,625, filed on Jun. 2, 2011.

(51) Int. Cl.
| | |
|---|---|
| G06F 21/60 | (2013.01) |
| G06F 17/30 | (2006.01) |
| G06F 21/36 | (2013.01) |
| G09C 5/00 | (2006.01) |
| H04L 9/32 | (2006.01) |

(52) U.S. Cl.
CPC ........ *G06F 21/602* (2013.01); *G06F 17/30598* (2013.01); *G06F 21/36* (2013.01); *G09C 5/00* (2013.01); *H04L 9/3228* (2013.01); *H04L 2209/16* (2013.01)
USPC ............................................................ 726/2

(58) Field of Classification Search
USPC ............................................................ 726/2
See application file for complete search history.

(56) References Cited

U.S. PATENT DOCUMENTS

| | | | | |
|---|---|---|---|---|
| 8,396,766 | B1 * | 3/2013 | Enright et al. | 705/35 |
| 2003/0177366 | A1 * | 9/2003 | de Jong | 713/184 |
| 2004/0260955 | A1 * | 12/2004 | Mantyla | 713/202 |

* cited by examiner

*Primary Examiner* — Tu Nguyen
(74) *Attorney, Agent, or Firm* — San Diego IP Law Group LLP

(57) ABSTRACT

The present invention provides an image-based encryption and decryption technique where the user uses pre-chosen image categories to create an encryption/decryption key. The encryption key can be used to encrypt alphanumeric strings such as a confirmation code or other information. The user uses the decryption key, i.e., knowledge of the chosen image categories) to decrypt and recover the original message. For example, upon presentation of a grid of images, the user selects certain images contained therein that match the pre-chosen image categories to recover the original message.

14 Claims, 2 Drawing Sheets

GRAPHICAL ENCRYPTION AND DISPLAY OF CODES AND TEXT

CROSS-REFERENCE TO RELATED APPLICATIONS

The present invention claims priority to and is a continuation-in-part of U.S. patent application Ser. No. 12/977,559, entitled "Methods and Systems for Graphical Image Authentication," and filed Dec. 23, 2010, now U.S. Pat. No. 8,850,519 which is a continuation of U.S. patent application Ser. No. 11/677,562, entitled "Methods and Systems for Graphical Image Authentication," and filed Feb. 21, 2007, which is a continuation-in-part of U.S. patent application Ser. No. 11/420,061, entitled "Graphical Image Authentication and Security System," and filed May 24, 2006, the disclosures of all of which are herein incorporated by reference in their entireties. The present invention also claims priority to U.S. Provisional Patent Application No. 61/492,625, entitled "Graphical Encryption and Display of Codes and Text," and filed Jun. 2, 2011, the disclosure of which is herein incorporated by reference in its entirety.

BACKGROUND OF THE INVENTION

1. Field of Invention

The invention relates generally to applied cryptography and more particularly, to an image-based encryption/decryption technique for secure communication of one-time passwords and other information.

2. Description of Related Art

Computer networks, particularly those with global reach such as the Internet, have greatly influenced the way that individuals, companies and institutions conduct transactions, and store and retrieve documents, images, music, and video. Convenience, ease of use, speed, and low overhead costs are contributing factors to the widespread use of the Internet for purchasing goods as well as conducting confidential transactions. Entire industries have emerged as a result of the evolution of the Internet.

Secure access to data, computer systems and computer networks has been traditionally guarded with a username and password pair. This requires the user to protect the username and password from disclosure and unauthorized use by interlopers. If the username and password are not protected, accounts and files can be compromised—often leading to, among other things, financial fraud. Unfortunately, a number of rogue individuals and organizations have emerged that are dedicated to fraudulently obtaining confidential information for unauthorized or criminal activities.

A pervasive tool used in obtaining confidential information is keystroke-logging software, which employs a program that monitors and records what users type on their respective computers. Such software often comprises the payload of viruses, worms, Trojan horses, and other forms of malware that can compromise confidentiality and negatively affect computer performance. Keystroke-logging software can reveal what a user is typing on a computer, e.g., logins and passwords, without the user's knowledge of this event occurring. Companies and institutions routinely use keystroke-logging software to monitor employee activity. Also, families may use these types of programs to monitor children's online activities. The widespread availability of this type of software, however, has led to unauthorized or criminal use, resulting in the alarming rate of identity theft seen throughout the world.

Prime targets for these attacks are financial institutions and their respective customers, as more and more consumers and businesses use electronic methods for purchasing and making payments. The future trend is in favor of electronic transactions over cash, providing a wider field for identity theft.

Login information may also be heard by sophisticated analysis of the distinct sounds made by different keys. An inexpensive microphone near a keyboard can reveal most of what is being typed with a surprising degree of accuracy. Login information and authentication codes are also vulnerable to simple spying or shoulder-surfing, as a person with malicious intent watches what an unsuspecting user types on a web page to sign in to his or her account or authenticate a transaction. The rise in popularity of portable hand-held Internet devices creates a need for these security issues to be directly addressed by a security system tailored for the limitations and security challenges associated therewith. As these devices are often used in places that are more public and less secure, shoulder-surfing is more likely. Additionally, because they are so portable, they are easier to lose or have stolen than a traditional computer.

Portable hand-held Internet devices also can be difficult to use to enter passwords, as keyboards or touch-screens are often very small on such devices and use of such to enter passwords or authentication codes may cause errors. Therefore, simplification of authentication input is desired while maintaining or increasing user security.

Additional security mechanisms are necessary in addition to the username/password paradigm to provide stronger identity authentication. There have been various other attempts do so.

Enterprises and institutions are using costly physical devices to identify legitimate customers and users. The existing devices (often referred to as tokens) generate a unique and random pass code for each user every 30 to 60 seconds. If an attacker manages to intercept a user ID and password, the information cannot be used to access the site without an additional authentication identifier. The devices significantly reduce instances of identity or information theft, but present implementation challenges for both the institutions and individual users. For example, physical tokens may be misplaced and/or lost.

The enterprise may be met with consumer resistance in implementing the use of the physical device. If the user does not have the device, he or she cannot gain access to the site. Besides the tremendous initial cost of purchasing the physical devices and implementing the new system, if the device is lost, stolen, or damaged, the enterprise will incur even more significant costs. In the context of business use of the device, the company incurs the cost of lost productivity from a worker who cannot access company information, as well as the cost of replacing the actual device. In the context of consumer use, if the consumer cannot access his or her accounts because of a lost device, the direct costs, and more significantly, the indirect costs incurred by the enterprise to assist the consumer in gaining access far outweighs the advantages of using the device system.

In U.S. Pat. No. 5,559,961, Blonder provides a solution for utilizing graphical passwords. The framework described displays a static image in which the user touches predetermined areas of the screen, called tap regions, in a particular sequence. As the user taps various areas on the display, the regions tapped are successively removed from the screen. These regions of the screen, and the order of the sequence they are tapped, are chosen by the user during an initial enrollment phase. The sequence and regions of taps is stored in the system as the user's password. One shortcoming of this solution is the likelihood of a shoulder-surfing attack: once an attacker views a user entering the sequence by touching areas of the screen, he or she is then easily able to replicate the sequence to successfully gain access to the user's account.

U.S. Pat. No. 7,549,170 to Stubblefield uses inkblots as images for authentication of a user's identity when logging into computer systems. The authentication method described in Stubblefield provides for a display of a random sequence of inkblots that the user has identified when he or she enrolled his or her login information. One drawback to this process stems from the identification of the inkblot. Although the user is required to identify and verify the alphanumeric text associated with the inkblots in the enrollment process, the unspeakable nature of inkblots will cause consumers problems in remembering the code for their inkblot selections. A frustrated user will simply save their password information on their computer, write the information down, or enter incorrect password information, which defeats the security offered by this system. Also, this process is very intimidating for users, especially those who are new users, because the inkblot is easily misconstrued as a countless number of different objects. The inkblot is just that: a blot on a screen the user will associate with a real world object. If that user misinterprets or forgets the association they have made with the inkblot, then they are denied access to their system. More importantly, the sequence process significantly increases login time for users. Currently, users are demanding more secure login techniques, but they desire to maintain the same level of convenience that they currently enjoy with the username/password login process. This authentication technique does not provide the ease of use that consumers desire.

U.S. Patent Application Publication No. 2004/0230843 to Jansen, which is a login authentication process using a sequence of images selected by the user, illustrates the potential of image-based authentication in protecting users from identity theft. The authentication method described in Jansen begins with the user selecting an image theme, such as animals, and then selecting a sequence of images within the image theme that becomes the password (e.g., if the category chosen is animals, one possible sequence is horse, cat, dog, cat, cat, horse). The success of the login process is predicated on the user's ability to replicate the sequence of images he or she has chosen within the image theme. In other words, the user must memorize the proper sequence. One drawback appears to be the complex nature of the sequence process. As defined in Jansen, if a user feels that he or she will be unable to remember the password, the user will simply write down the password so that recall becomes unnecessary. Also, because the images are typically static (the user can elect to shuffle images between login attempts, but most will likely stay with the simple default configuration), software can be created to automate the process. In this scenario, the authentication requires no human interaction to complete the login, which tremendously decreases the level of security provided. Although the positions of the images can be shuffled within the grid, the fact that they are static means that shuffling only prevents attackers from guessing the likely placement of the sequence, not the images themselves. Moreover, the traditional text password is completely removed from the login process, meaning that the security offered in this solution is only single layer, whereas authentication processes that complement the existing login process provide multiple levels of security.

U.S. Pat. No. 7,562,222 and U.S. Patent Publication No. 2005/0268101 to Gasparini et al. discloses two way authentication including images which serve as customization information so that an entity can authenticate itself to a user, but is otherwise dissimilar.

U.S. Patent Application Publication No. 2003/0210127 to Anderson discloses an authentication key formed from a number of selected icons, e.g., a heart, a spade, and a diamond. During an authentication session, the user is presented with a matrix of icons including the pre-selected icons and other non-authenticating icons. The user selects a number of the presented icons and if the user selects the pre-selected icons (rather than any non-authenticating icons), the user is authenticated. One drawback of Anderson's authentication technique is that it suffers from many of the drawbacks associated with static passwords. For example, if the password is comprised (e.g., an interloper knows of the selected icons for that user), a positive authentication may be recognized for someone other than the actual authenticated user associated with the password.

Since many users share their passwords between multiple accounts, a user may use the same password on sensitive accounts (e.g., online banking, PayPal, email, etc.) as with accounts whose system and infrastructure may not be so secure. If the password is compromised from a less secure account, the password can be used on the more secure accounts. As such, additional levels of security are needed to prevent that password from being used on the user's other accounts, to prevent fraudulent online activity, mobile device abuse and misuse, unwanted personal information disclosure, and defamation via unauthorized social network postings.

A brute force password attack is an exhaustive alphanumeric search that systematically checks all possible letters, numbers, and characters until the correct password is found. In the worst case scenario, this attack would involve traversing the entire search space. A dictionary password attack, on the other hand, is a technique for defeating a password authentication mechanism by searching likely possibilities. A dictionary attack uses a targeted technique of successively trying all the words in a prearranged list of values (e.g., from a dictionary). In contrast with the brute force attack, where a large proportion key space is searched systematically, a dictionary attack tries only those possibilities which are most likely to succeed. Generally, dictionary attacks succeed because many people have a tendency to choose passwords which are short (e.g., 7 characters or fewer), single words found in dictionaries, or simple, easily-predicted variations on words, such as appending a digit.

Countermeasures against dictionary and brute force password attacks include limiting the number of attempts that a password can be tried unsuccessfully, introducing a time delay between successive attempts, and locking accounts out after unsuccessful logon attempts. Website administrators may also prevent a particular IP address from trying more than a predetermined number of password attempts against any account on the site.

However, these countermeasures fall short, since they do not distinguish between an authorized user who barely mistypes their password (or types another one of their passwords) and an unauthorized user whose attempts are nowhere even close, such as in a brute force or dictionary attack. As such, the countermeasures are not able to use this chance to catalog this relevant information about the unauthorized user's suspected breach, and as such, unauthorized users are less likely to be investigated and caught.

As Internet-based fraud and cybercrime continue to increase, many online businesses attempt to improve security by implementing multifactor authentication processes that rely on the user's smartphone or other mobile device as a second authentication factor. The username and password is the first factor (something the user knows) and the mobile phone is considered the second factor because it is considered something the user has. Existing two-factor authentication processes that rely on the user's smartphone typically send a one-time password or PIN to the user's phone via a simple message system (SMS) text message. When the user receives the one-time password or PIN, they type it into the web page to complete the authentication process.

Unfortunately, cybercriminals are aware of the increasing use of smartphones as an authentication factor and are increasingly targeting these channels for attack. They may use malicious software or SMS-forwarding technology to intercept the SMS-based authentication messages sent to users' phones and re-route the authentication message to a different number where they can receive the SMS text message, view it and authenticate a fraudulent transaction. Because SMS text messages are displayed in clear text, any person with access to the phone can read it. If the user's phone has been lost or stolen, anybody in possession of the phone can view the text message and authenticate a fraudulent transaction.

With the increasing number of security threats targeting this channel, businesses relying on mobile phones for two-factor, out-of-band authentication need a more secure approach than a simple SMS text message for authentication codes, one-time passwords and PINs.

Because of these noted shortcomings, an improved system and method is needed to create a security system that is exceedingly difficult for an interloper to compromise, while simultaneously easy for a business to deploy and maintain and for the legitimate user to use.

SUMMARY OF THE INVENTION

The present invention provides a new approach to the graphical encryption/decryption and display of codes and text (including but not limited to one-time passwords and authentication codes.) The invention takes a one-time password or code and randomly assigns pieces of the code to a series of images that fit into secret categories previously chosen by the user. When the user first registers or enrolls with a service, business, application, etc. they will select several categories of images that they must remember and keep secret. These secret categories will be used to re-assemble the code at a later date. When authentication is needed, the technology invention takes pieces of the code and randomly assigns the pieces to a series of pictures or images that fit the user's secret categories. It also randomly assigns other, "fake" pieces of code to other, random images. The user is presented with all the images on a visual display. To authenticate, they must correctly identify the images that fit their secret categories in a pre-determined order. Unbeknownst to the user, as they are identifying the images that fit their categories in order, they are essentially identifying and reassembling the pieces of code in the correct order. The user does not need to actually see the code, he or she is simply looking for and identifying the images that fit their secret categories. Behind the scenes, a server may verify whether or not the user correctly reassembled the code in the proper order. Alternatively, a system that is expecting the code from the user will itself verify correctness of entered (user-decrypted) code. The specific pictures that are presented to the user are different each time and are presented in a different location on the display each time. The code is a randomly generated, one-time code. The "dummy" images and pieces of code that are included are also random. This makes the authentication process very secure by creating and encrypting strong, one-time passwords and authentication codes. At the same time, the process is very easy for the end-user because they only need to remember their few categories and identify pictures/images that fit those categories.

The present invention can be used for, but not limited to, two-factor authentication solutions that use smartphones or other mobile devices as the authentication channel. It may also be used for other authentication and authorization scenarios including but not limited to mobile web authentication, secure logins, mobile device lock/unlock and mobile payment authorization In an embodiment of the invention, a method comprises the steps of: receiving a first string of alphanumeric characters; breaking the first string of alphanumeric characters into multiple pieces; assigning the multiple pieces of the first string of alphanumeric characters to a first number of image categories; assigning dummy pieces of alphanumeric characters to a second number of image categories, and facilitating presentation of images associated with the first number of image categories and the second number of image categories to a user. The first number of image categories are preselected and remembered by the user. The image categories included in the second number of image categories are different than the image categories included in the first number of image categories. The method may further comprise receiving a second string of alphanumeric characters, and comparing the second string of alphanumeric characters to the first string of alphanumeric characters and if they match, authenticating the user. The second string of alphanumeric characters is assembled from the number of images in a set of images that have been selected by the user.

In another embodiment of the invention, an encryption method implemented on a computer comprises the steps of: receiving a data string; segmenting the data string into a plurality of segments; assigning an encryption image to each of the plurality of segments, wherein the encryption images correspond to one or more pre-chosen image categories; facilitating a presentation of a plurality of images to a user, wherein the plurality of images comprises the encryption images and one or more non-encryption images, wherein the non-encryption images do not correspond to the one or more pre-chosen image categories. The one or more pre-chosen image categories are pre-selected and memorized by the user. Each one of the one or more pre-chosen image categories comprise a group of images sharing a common attribute and called by a common name. The one or more pre-selected and memorized image categories are memorized by a user in a particular order. The encryption images assigned to each of the plurality of segments are randomly selected from the one or more pre-chosen image categories.

In another embodiment of the invention, a decryption method comprises the steps of: receiving a presentation of a plurality of images, wherein the plurality of images comprises one or more encryption images and one or more non-encryption images, wherein the encryption images correspond to one or more pre-chosen image categories and the non-encryption images do not correspond to the one or more pre-chosen image categories, and the encryption images are associated with a particular segment of a data string; receiving an indication that a user has selected the one or more encryption images, wherein the indication comprises the particular encryption images that the user has selected and the order by which those particular encryption images have been selected; identifying the particular segments of the data string corresponding to the indication; and identifying the data string. The one or more pre-chosen image categories are pre-selected and memorized by the user. Each one of the one or more pre-chosen image categories comprise a group of images sharing a common attribute and called by a common name. The one or more pre-selected and memorized image categories are memorized by a user in a particular order.

An advantage of the present invention is that it provides defensive technique to combat attempts at stealing codes by people and computers. It is also a means of encrypting and hiding the authentication code or one-time password within a graphical display so a person looking at the display would not be able to see, know or use the authentication code. The present invention provides a more secure process of delivering codes and text as well as authenticating by essentially encrypting the code by splitting it into pieces and assigning those pieces to seemingly random images, relying on the user to decrypt the code by identify the correct images. In addition to being a more secure authentication process, it is also much easier for people to use, especially on smartphones and mobile devices.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, and the advantages thereof, reference is now made to the ensuing descriptions taken in connection with the accompanying drawings briefly described as follows.

DETAILED DESCRIPTION OF EMBODIMENTS

Figure 1:
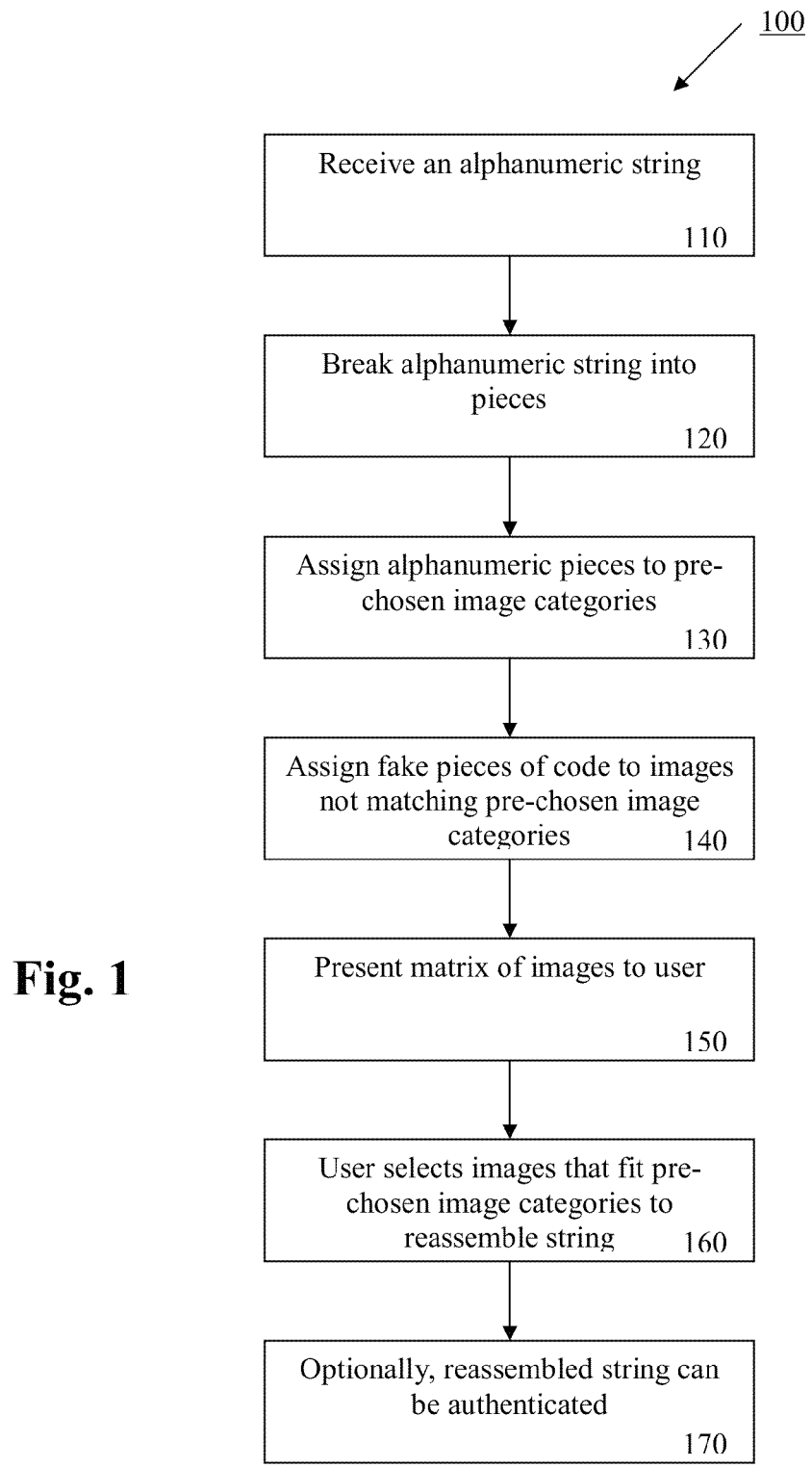
FIG. 1 illustrates an image-based encryption and decryption method according to an embodiment of the invention.

Further features and advantages of the invention, as well as the structure and operation of various embodiments of the invention, are described in detail below with reference to the accompanying FIGS. 1-2, wherein like reference numerals refer to like elements. Although the invention is described in the context of alphanumeric characters, non-alphanumeric characters may be used.

The present invention is based on the authentication and security techniques disclosed in currently pending U.S. Pat. No. 8,117,458, entitled "Methods and Systems for graphical Image Authentication," the disclosure of which is incorporated herein in its entirety.

In the '458 patent, a user is generally required to select a number of image categories at the time of registration with an image-based authentication and security system that the user can remember at a later time. For example, a user may select three image categories: dogs, cars, and clocks, from a greater number of available image categories. The user need only remember those image categories. For example, when the user is later presented with a random grid (e.g., 3×3 matrix) of images (referred to herein as an "ImageShield®"), each of which is associated with a different alphanumeric character or multiple characters, the user need only identify the images of dogs, cars, and clocks and then enter the corresponding alphanumeric characters. Other non-selected image categories such as, but not limited to fish, flowers, and people, are included in the grid. If the alphanumeric characters entered by the user match those expected by the system (e.g., those displayed and associated with dogs, cars, and clocks), the user is authenticated. If the user enters an unexpected alphanumeric character (e.g., those displayed and associated with fish, flowers, or people), authentication will fail. Such an image-based authentication technique may be used as a stand-alone technique or as a second layer of security on top of a conventional login and password technique. The alphanumeric characters have no intrinsic meaning beyond simply being a way to uniquely identify the image categories.

Identification of the pre-chosen image categories can be performed by a user entering alphanumeric characters associated with the presented images. Alternatively, a user equipped with a touch-screen device such as, but not limited to an iPhone or iPad, may simply touch the images displayed to select the pre-chosen image categories and the alphanumeric characters associated with such.

The authentication and security system described in the '458 patent may require the user to not only remember the selected image categories, but a particular sequential order of those image categories as well. For example, if the user selects image categories as dogs, cars, and clocks, the system requires the user to enter the respective alphanumeric characters associated with dogs, cars, clocks in that order. In other words, if the user entered alphanumeric characters associated with cars, dogs, and clocks in that respective order, authentication would fail.

The present invention provides an image-based encryption and decryption technique where the user uses their knowledge of their secret categories to decrypt the message hidden in the ImageShield. Particularly, the user uses the pre-chosen image categories to create a symmetrical encryption/decryption key. The encryption key can be used to encrypt alphanumeric strings such as a confirmation code or other information. The user uses the decryption key, i.e., knowledge of the chosen image categories and a particular sequence of those image categories) to decrypt and recover the original alphanumeric string.

FIG. 1 illustrates an image-based encryption and decryption method 100 according to an embodiment of the invention. The method 100 begins by receiving (step 110) an alphanumeric string that is to be encrypted. For example, a requester may provide the alphanumeric string to be sent to a recipient, i.e., user, or alternatively, the alphanumeric string may be generated by a server providing the subsequent ImageShield. The alphanumeric string is then broken (step 120) into pieces, i.e., segments. The alphanumeric pieces are then assigned (step 130) to specific images (referred to herein as "encryption images") associated with a user's pre-chosen image categories. The pre-chosen image categories image categories each comprise a group of images sharing a common attribute and called by a common name, e.g., dogs, cats, cars, bird, flowers, etc. The alphanumeric pieces are not assigned randomly to images as could be the case in an authentication system. Rather, they are purposefully assigned to the images that fit the user's pre-chosen image categories. Fake pieces of code or "dummy" data are randomly assigned (step 140) to other images to be presented in a grid or matrix of images, i.e., the ImageShield. The ImageShield is then presented (step 150) to the user. The user identifies (step 160) the images that fit their pre-chosen image categories in the particular order in which they were first chosen. Since each image is associated with a piece of the alphanumeric string, the alphanumeric string is reassembled from the user's correct selection of the images, i.e., the string is decrypted. Optionally, the reassembled alphanumeric string can be authenticated (step 170) to determine whether or not the string has been reassembled correctly. For example, the reassembled string can be sent to a server providing the images or alternatively, to the requester who provided the alphanumeric string in the first place.

Hence, the present invention provides a symmetrical encryption/decryption technique where the cryptographic key (used for both encryption and decryption) is derived from pre-chosen image categories and a defined order, known only to the user and provider of the image categories.

Figure 2:
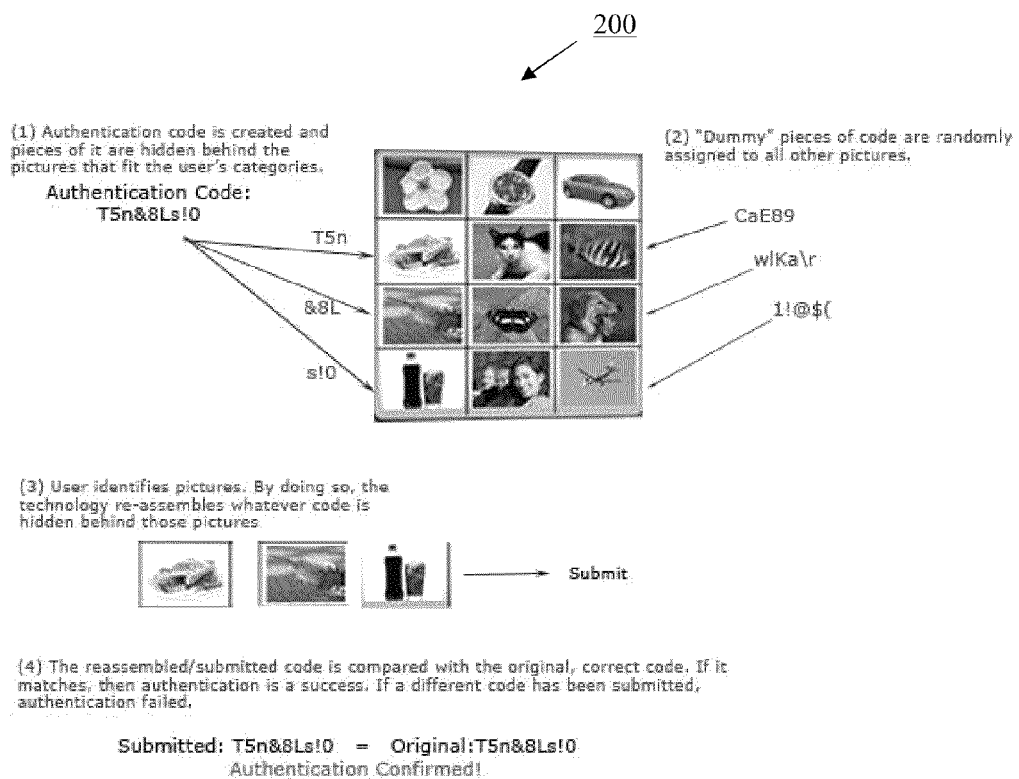
FIG. 2 illustrates an exemplary ImageShield according to an embodiment of the invention.

FIG. 2 illustrates an exemplary ImageShield 200 according to an embodiment of the invention. Here, the ImageShield 200 is shown as a 3×4 image grid. Prior to the display of the ImageShield 200, a user has chosen a certain number of image categories to be used in a specific order as an encryption/decryption key. In the exemplary ImageShield, the user has chosen the following image categories: food, birds, and drinks. The user remembers those chosen image categories and the sequential order that they have been chosen. The alphanumeric string (or "authentication code"), "T5n&8Ls!0", is to be encrypted in this example. That alphanumeric string is broken into the following pieces: "T5n", "$8L", and "s!0". Those pieces are then assigned to respective images associated with image categories food, birds, and drinks (in that order). Dummy pieces of alphanumeric code are assigned to other images not associated with the user's pre-chosen image categories. For example, dummy code pieces "CaE89", "w1Ka\r", and "1!@$(" are assigned to images associated with image categories fish, dogs, and planes in the illustrated example. Other pieces of dummy code would be assigned to the remaining images in the illustrated 3×4 matrix. Upon presentation of the ImageShield 200, the user identifies the images associated with the pre-chosen categories (in order). Particularly, the user identifies the image associated with food, then the image associated with birds, then the image associated with drinks. By doing so, the user has decrypted the ImageShield 200 and reassembled the alphanumeric string. Thus, the present invention provides a way of encrypting/decrypting useful information, such as alphanumeric codes through easily remembered image categories.

In an embodiment of the invention, the pieces of alphanumeric code (including dummy pieces) are not shown with the images as first presented in the ImageShield. Instead, they are only revealed upon selection of the images. For example, in a touch screen interface, the user would first tap on the food image to reveal "T5n", then tap on the bird image to reveal "&8L", and then tap on the drink image to reveal "s!0". Selecting any other image from the displayed ImageShield 200 would result in the wrong alphanumeric string being revealed. In another embodiment of the invention, the alphanumeric characters are never revealed to the user.

In another embodiment of the invention, the pieces of alphanumeric code (including dummy pieces) are shown within the images in the ImageShield. The user by looking at the ImageShiled decrypts the original code by combining the characters that appear within the images of his/her selected categories. For example, the user receives a static picture of an ImageShield delivered via MMS or email. The user would see on the food image "T5n", on the bird image "&8L", and on the drink image "s!0". The user thus reassembles "T5n&8Ls!0" Typing any other characters appearing within the other images on the ImageShield 200 (or using the selected images in the wrong order) would result in the wrong alphanumeric string.

In an embodiment of the invention, the reassembled string is compared by a server with the original, correct alphanumeric string to authenticate the user. If they match, the user is authenticated. If they do match, the user fails authentication. In another embodiment, the pieces of the alphanumeric string are never revealed to the user.

The use of a 3×4 image grid is exemplary only. Any number of images may be used in the ImageShield. For example, the grid may comprise n rows and m columns, where n and m are any positive integers. Moreover, the number of pre-chosen image categories may be any positive integer less than n×m. The images are randomly displayed in a different location on the grid each time.

By delivering this type of knowledge-based authentication challenge rather than a clear text code, the authentication code is hidden and is able to be re-assembled only by the legitimate user—the only person who knows what categories they originally chose and in what order. Even if a criminal has possession of the user's phone or attempts to use fraudulent SMS forwarding, it is very unlikely that they would be able to correctly authenticate because they would not know the user's secret categories or the order in which to identify the appropriate images.

Another benefit to this type of image-based authentication challenge is that it's much easier on the user. Not only is it easy for people to remember broad categories and recognize images that fit those categories, but also the user does not have to type the long strings of alphanumeric characters that are typically used for one-time passwords or authentication codes. Tapping an image on the smartphone screen is much easier than typing on a tiny smartphone keyboard or trying to copy a one-time password from the phone to the computer. A survey conducted by Javelin Strategy and Research group confirmed that 6 out of 10 consumers prefer easy-to-use authentication methods such as image identification/recognition.

This invention may also be used for other authentication processes, authenticating Web transactions online or authorizing mobile payments. It could be used for device lock/unlock on web-enabled devices. Alternatively, the process could also be used to graphically encode a one-time passcode that could be sent to the user's mobile phone via a multimedia message (MMS). The user would receive the MMS of the image grid and have to identify the appropriate images that fit their secret categories, then type the alphanumeric characters that appear in those images into web page in order to manually reassemble the pieces of code in the correct order and submit it on the website to proceed. The invention could also be integrated into other multifactor authentication solutions.

The steps of a method or algorithm described in connection with the embodiments disclosed herein may be embodied directly in a computer or electronic storage, in hardware, in a software module executed by a processor, or in a combination thereof. A software module may reside in a computer storage such as in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a mobile station. In the alternative, the processor and the storage medium may reside as discrete components in a mobile station.

It is to be recognized that depending on the embodiment, certain acts or events of any of the methods described herein can be performed in a different sequence, may be added, merged, or left out altogether (for example, not all described acts or events are necessary for the practice of the method). Moreover, in certain embodiments, acts or events may be performed concurrently, for example, through multi-threaded processing, interrupt processing, or multiple processors, rather than sequentially.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

We claim:

1. A method implemented on a computer comprising the steps of:
   receiving, at the computer, a first string of alphanumeric characters;
   breaking the first string of alphanumeric characters into multiple pieces;
   assigning the multiple pieces of the first string of alphanumeric characters to a first number of pre-chosen image categories, wherein the first number of pre-chosen image categories are chosen and sequentially ordered by a user and each one of the pre-chosen image categories comprise a group of images sharing a common attribute perceived by a human;
   randomly selecting images from the first number of pre-chosen image categories;
   assigning dummy pieces of alphanumeric characters to a second number of image categories not selected by the user, and
   facilitating presentation of a matrix of the randomly selected images from the first number of image categories and the second number of image categories to the user,
   wherein images in the first number of image categories correspond to more than one alphanumeric character and at least one of the images in the first number of images categories correspond to both a number character and alphabetic character,
   wherein images in the first number of image categories are configured to be selected by a user tapping or selecting the images without entering the corresponding alphanumeric character.

2. The method of claim 1, wherein the first number of image categories are remembered by the user.

3. The method of claim 2, wherein the image categories included in the second number of image categories are different than the image categories included in the first number of image categories.

4. The method of claim 3, further comprising the steps:
   receiving a second string of alphanumeric characters, and
   comparing the second string of alphanumeric characters to the first string of alphanumeric characters and if they match, authenticating the user.

5. The method of claim 4, wherein the second string of alphanumeric characters is assembled from a number of images of the matrix of images that have been selected by the user.

6. An encryption method implemented on a computer, the method comprising the steps of:
   receiving a data string;
   segmenting the data string into a plurality of segments;
   assigning a randomly selected encryption image to each of the plurality of segments, wherein the randomly selected encryption images correspond to two or more pre-chosen image categories, wherein the two or more pre-chosen image categories are chosen and sequentially ordered by a user and each one of the pre-chosen image categories comprise a group of images sharing a common attribute perceived by a human;
   facilitating a presentation of a plurality of images to the user, wherein the plurality of images comprises the randomly selected encryption images and one or more non-encryption images, wherein the non-encryption images do not correspond to the two or more pre-chosen image categories,
   wherein the randomly selected encryption images correspond to more than one alphanumeric character and at least one of the randomly selected encryption images correspond to both a number character and alphabetic character,
   wherein the randomly selected encryption images are configured to be selected by a user tapping or selecting the images without entering the corresponding alphanumeric character.

7. The encryption method of claim 6, wherein the two or more pre-chosen image categories are pre-selected and memorized by the user.

8. The encryption method of claim 7, wherein each two of the two more pre-chosen image categories comprise a group or" images sharing a common attribute.

9. The encryption method of claim 6, wherein the two or more pre-selected and memorized image categories are memorized by a user in a particular order.

10. The encryption method of claim 6, wherein the encryption images assigned to each of the plurality of segments are randomly selected from the two or more pre-chosen image categories.

11. A decryption method implemented on a computer, the method comprising the steps of:
    receiving a presentation of a plurality of images, wherein the plurality of images comprises two or more encryption images and one or more non-encryption images, wherein the encryption images correspond to and are randomly selected from two one or more pre-chosen image categories and the non-encryption images do not correspond to the two more pre-chosen image categories, and the encryption images are associated with a particular segment of a data string, wherein the two or more pre-chosen image categories are chosen and sequentially ordered by a user;
    receiving an indication that the user has selected the one two or more encryption images, wherein the indication comprises the particular encryption images that the user has selected and the order by which those particular encryption images have been selected,
    wherein the encryption images correspond to more than one alphanumeric character and at least one of the encryption images correspond to both a number character and alphabetic character,
    wherein the encryption images are configured to be selected by a user tapping or selecting the images without entering the corresponding alphanumeric character;
    identifying the particular segments of the data string corresponding to the indication; and
    identifying the data string.

12. The decryption method of claim 11, wherein the two or more pre-chosen image categories are memorized by the user.

13. The decryption method of claim 12, wherein each one of the two or more pre-chosen image categories comprise a group of images sharing a common attribute.

14. The decryption method of claim 11, wherein the sequential order of the two or more pre-chosen image categories is memorized by the user.

* * * * *